Patented May 24, 1949

2,471,090

UNITED STATES PATENT OFFICE 2,471,090

3-THENYL BROMIDE SALTS

Ernest E. Campaigne and William M. Le Suer, Bloomington, Ind., assignors to Indiana University Foundation, Monroe County Ind., a corporation of Indiana No Drawing. Application November 28, 1947, Serial No. 788,662

4 Claims. (Cl. 260—329)

The present invention relates to the preparation of 3-thenaldehyde, and is more particularly concerned with a novel method for the preparation thereof from 3-methylthiophene.

It is an object of the present invention to provide a novel process for the preparation of 3-thenaldehyde which is more economically and technically satisfactory than previously known methods. A further object of the invention is the provision of a simple three step process for the preparation of 3-thenaldehyde from 3-methylthiophene. Other objects of the invention will become apparent hereinafter.

The method of the present invention essentially comprises the conversion of 3-methylthiophene to 3-thenyl bromide by reaction with N-bromosuccinimide in the presence of a catalytic amount of an organic peroxide catalyst, subsequent conversion of the 3-thenyl bromide to a quaternary methyleneamine salt thereof, and steam-distillation of a water solution of the amine salt to produce 3-thenaldehyde.

The 3-methylthiophene and N-bromosuccinimide are first reacted in the presence of a small amount of an organic peroxide catalyst, which has been found an essential feature of the bromination reaction for the production of the desired 3-thenyl bromide in high yields. Representative catalysts are benzoyl peroxide, perbenzoic acid, and acetyl peroxide. Benzoyl peroxide is, however, the preferred catalyst for the bromination reaction. Catalyst may be present in the reaction in an amount from traces to about 0.04 mole for each mole of the 3-methylthiophene, or even higher, although no advantageous results are usually attained by employing more than about 0.02 mole of catalyst per mole of 3-methylthiophene.

The bromination step may be conveniently conducted by mixing together equimolar proportions of 3-methylthiophene and N-bromosuccinimide in the presence of the peroxide catalyst, e. g., benzoyl peroxide, and maintaining the said reactants in contact with each other for a sufficient period of time for the reaction to be substantially complete. This time may conveniently be about six hours. Although other proportions of reactants may be employed, no material advantage is gained by employment of an excess of either of the reactants, and equimolar proportions appear to be about optimum. The reactants may be maintained in intimate contact by agitation and/or refluxing at the boiling point of the particular solvent employed. Temperature for the reaction may be between about 20 degrees and about 130 degrees centigrade, with the reflux temperature of the particular solvent employed being preferred. Carbon tetrachloride, petroleum ether and benzene may be mentioned as reaction media, but other common organic solvents which are inert to the reactants under the conditions employed are also satisfactory. Additional catalyst may be added from time to time as required, and such addition is advantageously accomplished with shaking to disperse the catalyst throughout the mixture of reactants. After completion of the reaction period, e. g., five or six hours, the heating may be discontinued, reaction product cooled, succinimide filtered from the product, and the product thereafter freed of solvent by distilling under reduced pressure and purified according to conventional procedure.

The second step in the process comprises conversion of the 3-thenyl bromide to a quaternary methylamine salt thereof. This may be conveniently accomplished by mixing together the 3-thenyl bromide and the selected amine, e. g., hexamethylenetetramine, preferably in an organic solvent inert to the reactants under the conditions of reaction, such as chloroform, benzene, tetrachloroethylene, or carbon tetrachloride. The quaternary methyleneamine salt is insoluble in organic solvents, while any nuclearly-brominated impurities, which may be present along with the 3-thenyl bromide, are soluble therein. An efficient separation may thus be accomplished. Equimolar proportions of the 3-thenyl bromide and tertiary methyleneamine are satisfactory, other proportions may be used if desired. The mixture of reactants may be stirred at a temperature between about 20 degrees and about 120 degrees centigrade for a period of time sufficient to allow completion of the reaction, usually between about one-half hour and one hour, whereafter the amine salt may be washed with ether or other suitable solvent and dried in air. The salt may be further purified by crystallization from absolute ethanol, if desired, to yield a crop of white needles.

The quaternary methyleneamine salt may then be dissolved in water and steam-distilled therefrom. Rapid distillation of the water solution and acidification of the distillate with an acid, such as hydrochloric, if desired, to dissolve out amine impurities from the organic layer, produces excellent yields of 3-thenaldehyde, which may be extracted with ether or other suitable solvent. After drying and removal of solvent, as on a steam bath, distillation of the residue at atmospheric pressure allows yields of 3-thenaldehyde as high as 32 per cent of the theoretical amount based on the N-bromosuccinimide employed in the initial bromination step. The 3-thenaldehyde may be converted to suitable aldehyde derivatives, if desired, the preparation of which is known to the art.

The following example is given to illustrate the practice of the present invention, but is in no way to be construed as limiting:

Eighty-eight and one-half (0.5 mole) of N-bromosuccinimide and 0.2 grams of benzoyl peroxide were added to a solution of 55 grams (0.56 mole) of 3-methylthiophene in 150 milliliters of carbon tetrachloride. The reaction flask was shaken vigorously to disperse the peroxide and heating was commenced. An additional 0.2 gram of benzoyl peroxide was added to the flask during the first ten minutes of heating, and the flask and contents were shaken vigorously during the first hour of heating. After an additional five hours of refluxing, the flask was cooled in an ice-bath, succinimide removed by suction filtration and washed with carbon tetrachloride. The wash was then added to 50 milliliters of the main carbon tetrachloride solution, together with the solution from an identical run, prior to removal of solvent by distillation under reduced pressure. The highly lachrymatory oil which remained was distilled under vacuum and 114 grams of light tan oil collected at 60–100 degrees centigrade under 2 millimeters of mercury pressure. This material darkened slowly upon standing. Purification yielded a sample boiling at about 75–78 degrees centigrade at one millimeter of mercury pressure absolute; $D_4^{20}$ 1.635, $N_D^{20}$ 1.604.

The 114 grams of 3-thenyl bromide from the above was dissolved in 200 milliliters of chloroform and 90 grams of hexamethylenetetramine added thereto. The mixture was refluxed for a period of one hour, cooled, and the hexamethylenetetramine salt removed by suction filtration. The hexamethylenetetramine salt was washed with 100 milliliters of ether and dried in air to yield 150 grams of product, which was purified by crystallization from absolute ethanol to yield white needles which softened at 120 degrees centigrade and melted completely with browning at 150 degrees centigrade.

Anal.—Calcd. for $C_{11}H_{17}N_4SBr$: S, 10.10
Found: S, 9.80

The hexamethylenetetramine salt (150 grams), prepared as above, was dissolved in 500 milliliters of hot water and rapidly steam-distilled, one liter of distillate being collected in all. The distillate was acidified with hydrochloric acid and extracted with three 100-milliliter portions of ether. The ether solution was dried and the ether removed on a steam bath. Distillation of the residue at atmospheric pressure yielded 35.8 grams of 3-thenaldehyde, B. P., 195–199 degrees centigrade at 744 millimeters of mercury pressure absolute; $D_4^{24}$ 1.2800, $N_D^{20}$ 1.5860.

The phenylhydrazone crystallized as white leaflets from a solution of water and ethanol, M. P. 136–137 degrees centigrade. The 2,4-dinitrophenylhydrozone crystallized as deep orange needles from nitromethane, M. P. 236–237 degrees centigrade.

Anal.—Calcd. for $C_{11}H_8O_4N_4S$: S, 10.97
Found: S, 11.09

The semicarbazone crystallized from a water-ethanol solution as white leaflets, M. P., 233–234 degrees centigrade.

Anal.—Calcd. for $C_6H_7N_3OS$: S, 18.95
Found: S, 19.25

The preparation of 3-thenyl bromide from 3-methylthiophene and N-bromosuccinimide is more fully described in our co-pending application Serial No. 788,664, and the preparation of 3-thenaldehyde from 3-thenyl bromide is described in our co-pending application Serial No. 788,665, both filed concurrently herewith.

Various modifications may be made in the present invention without departing from the spirit or scope thereof, and it is to be understood that we limit ourselves only as defined in the appended claims.

We claim:

1. The process which includes: mixing 3-thenyl bromide with a tertiary methyleneamine at a temperature between about 20 degrees and about 120 degrees centigrade to prepare the quanternary methyleneamine salt of 3-thenyl bromide.

2. The process of claim 1, wherein the tertiary methyleneamine is hexamethylenetetramine.

3. The process of claim 1, wherein the reaction is conducted in an organic solvent inert to the reactants under the conditions of reaction.

4. The hexamethylenetetramine salt of 3-thenyl bromide, having the formula:

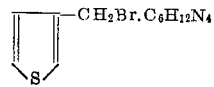

ERNEST E. CAMPAIGNE.
WILLIAM M. LE SUER.

No references cited.